Dec. 13, 1960
N. J. PASKIN
2,964,373
DRAWER SLIDE
Filed Sept. 8, 1959
2 Sheets-Sheet 1
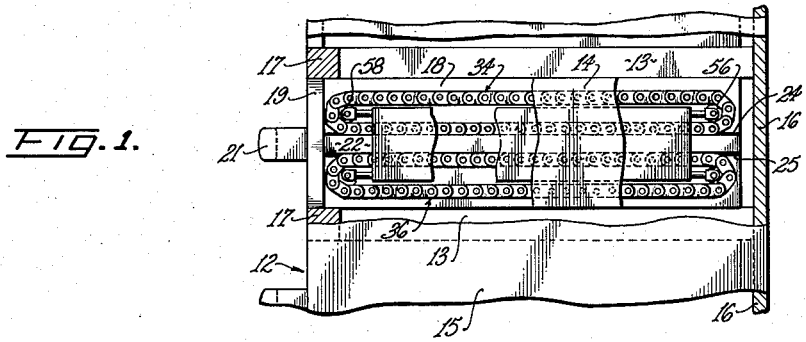
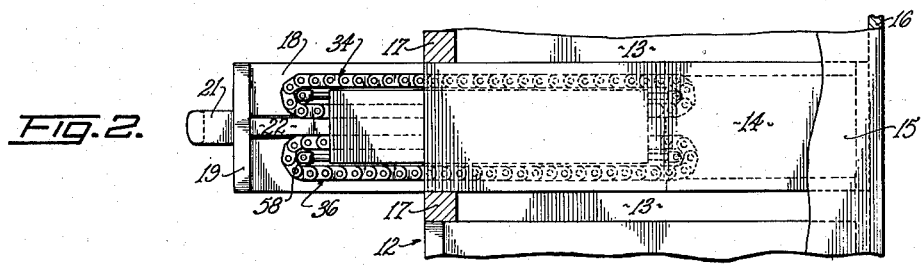
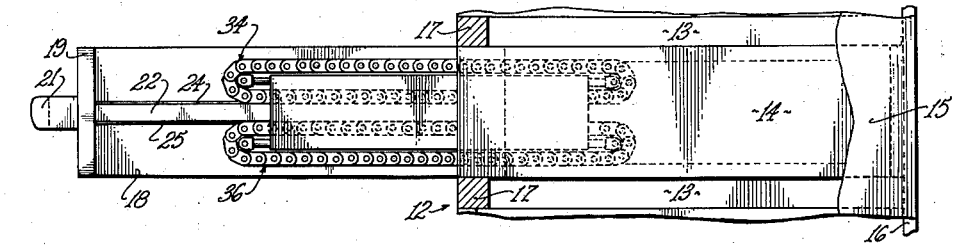
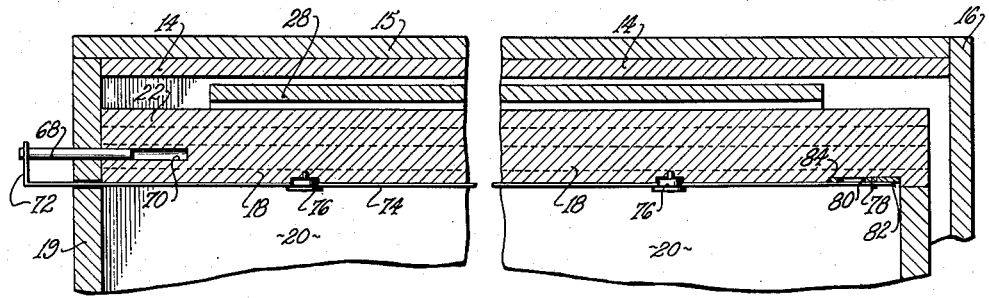
INVENTOR.
NATHAN J. PASKIN
BY
*Sellers & Latta*
ATTORNEY Dec. 13, 1960 N. J. PASKIN 2,964,373
DRAWER SLIDE
Filed Sept. 8, 1959 2 Sheets-Sheet 2
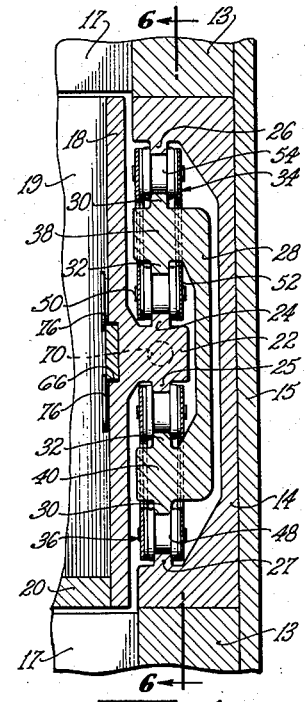
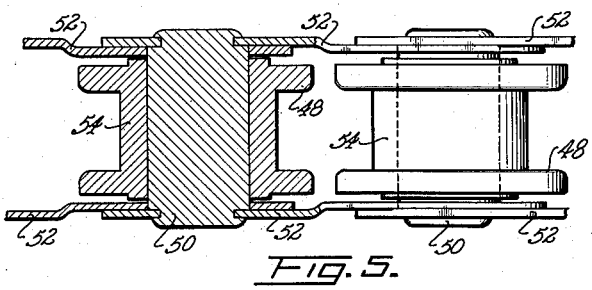
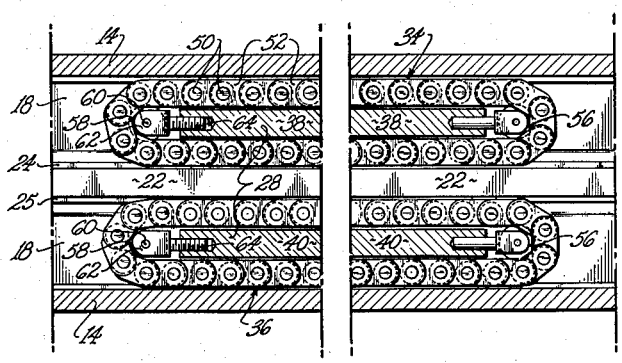
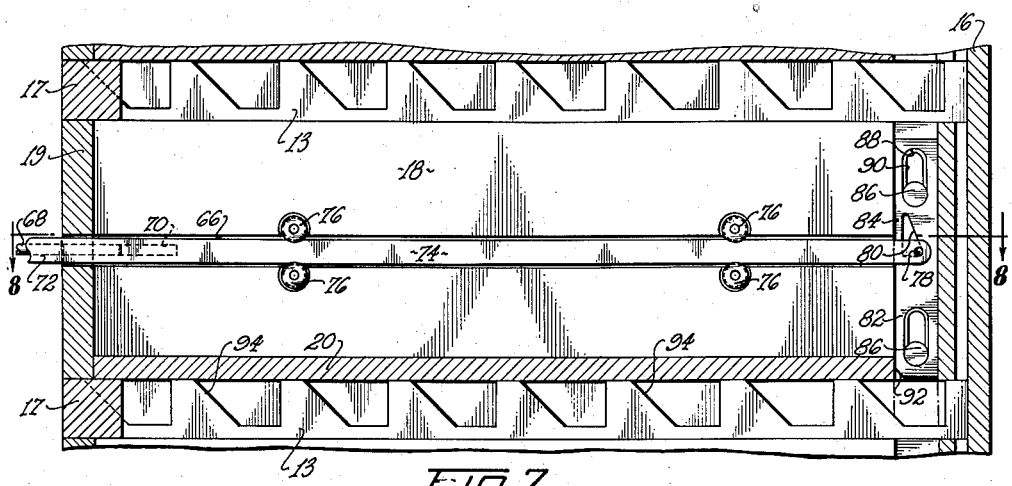
INVENTOR.
NATHAN J. PASKIN
BY
ATTORNEYS

United States Patent Office 2,964,373
Patented Dec. 13, 1960

2,964,373
DRAWER SLIDE

Nathan J. Paskin, North Hollywood, Calif., assignor to Pasbro Tool and Manufacturing Company Inc., North Hollywood, Calif., a corporation of California Filed Sept. 8, 1959, Ser. No. 838,769

5 Claims. (Cl. 312—339)

This invention relates to slidable supporting members such as trays or drawers and more particularly to novel slide mechanisms which are characterized by imparting continuous stability to the moving or movable drawer at any partial or completely outdrawn position.

Such devices find special application in normally vibrating mounts such as aircraft wherein the use of ordinary drawers capable of independent vibration results in the vibration of the airplane being compounded in the vibration which it sets up in the drawer. This is especially disadvantageous in connection with the use of delicate electronic equipment mounted in the drawer or slidable tray.

Accordingly it is an object of the invention to provide improved slidable vibration-free mounts for delicate precision equipment and the like.

Another purpose resides in the provision of such slidable assemblies which can be installed in a normally vibrating vehicle such as an airplane or ship, without an increased vibration being set up in the slidable member by the vehicle.

Yet another object is to provide cant or tilt-free drawers or trays which can be left at any partially outdrawn position and remain in the original horizontal alignment with respect to their housing cabinets.

Still another improvement resides in the provision of endless roller chains disposed between a slidable member and its supporting frame in mutual rolling registration with rails carried by the slide and frame respectively, the chains themselves being carried by an intermediate sliding plate. Yet other advantages are provided by novel locking means designed to hold the tray in selected out-drawn positions.

Other objects and advantages of the invention will be apparent from the following description and claims, the novelty consisting in the features of construction, combination of parts, the unique relations of the members and the relative proportioning, disposition, and operation thereof, all as more completely outlined herein and particularly pointed out in the claims.

In the drawings, which form part of the present specification:

Fig. 1 is a side elevation of a cabinet containing my slide assembly, in closed position, with portions broken away to show inner construction;

Figs. 2 and 3 are corresponding views with the drawer and slide assembly in half drawn-out and completely drawn-out positions respectively, with additional portions of the latter broken;

Fig. 4 is a vertical sectional view taken through adjacent side walls of drawer and frame, showing the slide assembly disposed therebetween;

Fig. 5 shows two connected units of the roller chain, the one at the left in axial section and the one at the right in top plan;

Fig. 6 is a vertical section taken at right angles to Fig. 4 along the line 6—6, the roller chains being seen in elevation, and somewhat smaller scale;

Fig. 7 is a side elevation of the inner face of the drawer wall which is opposite the drawer wall 18 of Fig. 4, particularly showing the draw bar and latch plate; and Fig. 8 is a transverse section taken along the line 8—8 of Fig. 7.

As here illustrated, there are provided pairs of fixed side channel members 14 and interposed fixed bars 13 mounted in a suitable outer frame or shell 12 of a cabinet such as may be used to support or enclose a drawer or tray containing files, maps, tools, instrument panels, workpieces, etc., the cabinet being constructed of upright parallel side walls 15, transversely connected as by a back wall 16 and horizontal front struts 17 or other suitable frame structure. However, my slide assemblies may be supported on a floor or table, stacked on each other, or otherwise arranged, and the outer frame may be open-topped with only skeletal supporting walls, or it may completely enclose the slidable members as desired. Spaced within and substantially parallel to the frame members 14 are a pair of opposing side walls 18 of a drawer or tray or similar supporting member, the upright walls transversely connected as by a bottom wal 20 (Fig. 4) or braces, with a front wall 19 and draw knob or handle 21, and open-topped or otherwise as desired. Each side wall 18 carries on its outer face a medial, longitudinal projecting rib 22, formed with a pair of vertically aligned rails 24, 25 extending respectively upward and downward therefrom along approximately the length of the wall 18, being substantially rectangular in cross section.

Eash frame member 14 is formed as an inwardly directed C having respectively downwardly and upwardly projecting rails 26, 27 or similar dimensions to the rails 24, 25 and in vertical alignment therewith. It will be appreciated that the frame wall 14 and its rails 26, 27 are stationary, while the drawer wall 18 with its rails 24, 25 are horizontally movable. There is disposed between these two walls, a slide 28 of inwardly directed C shape configuration, each arm of the C being formed with respective outer and inner rails 30, 32 along its top and bottom margins, and in general vertical alignment with the similar rails of the frame and drawer walls disposed respectively above-below and intermediate (or within the arms of the C). The adjacent drawer and frame side walls (14, 18) are connected through the slide 28 by means of a pair of endless roller chains 34, 36 wound about respective arms 38, 40 of the slide in rolling registration with the respective rails 30, 32.

Each roller chain is assembled of successive transverse cylindrical spacers 50 joined together by identical pairs of two-step links 52 and with radially flanged, tubular rollers 54 rotatable on the respective spacers 50. The ends of each roller chain are joined together to form an endless unit which is mounted over a longitudinally separated pair of idler rollers 56, 58 (Fig. 6) carried by opposite ends of each arm 38, 40 and positioned within the rail guide channel 48 formed by the roller flanges, thus delineating the path of the endless chain by their locations at opposite ends thereof. One of these rollers (58) of each pair is disposed on a cross pin 60 (Fig. 3) between the arms of a fork 62, the stem 64 of which is threaded into a corresponding threaded bore in the end of the respective arm 38, 40 for adjustment such that the respective roller 58 is positioned to maintain the roller chain properly tensioned.

As seen in Figs. 1–3, with the drawer in closed position, the slide 28 and its upper and lower roller chains 34, 36 are disposed between the opposing side walls 14, 18 adjacent the forward edge of the drawer. As the drawer is drawn out, the slide assembly 28 emerges from outer frame 14 at half the speed of the drawer. Thus, when the drawer is completely pulled out, the forward half of slide 28 is in direct supporting relation to the drawer, and its rear half is supported in side members 14.

While the assembly has been here shown with the longitudinal medial rib 22 secured to the movable drawer panel 18, and the upper and lower rails 26, 27 carried by the stationary frame wall 14, it will be appreciated that these positions can be reversed, that is, with the rib on the stationary member and the upper and lower rails on the movable member. In such case, the C slide 28 would be outwardly facing instead of inward. In either arrangement, the drawer does not tilt or cant (as is the case with ordinary slide drawers even when tightly positioned in slideways and hence even difficultly movable). Since it maintains its originally level position, its in and out movement can be stopped at any partly open position. It is particularly adapted for use in moving mounts such as aircraft, ships, railway carriages, automobiles, elevators, etc. because the vibration of the mount is not magnified by a looseness between the drawer and frame, but the drawer, whether open or closed, moves no more than does the surrounding carriage. If desired, it can even be placed in a gyroscopic mount.

Means are also provided for locking the sliding assembly selectively at successive positions of extension including the completely drawn out position. Along the inner face of one drawer side 18 is a longitudinal, generally rectangular slideway 66 (Fig. 7), medially located so as to be approximately parallel and in horizontal alignment with the outer rail-carrying rib 22. The forward end of the rib is horizontally drilled so as to receive a cylindrical slide pin 68 in the bore 70, the outer end of the pin being secured to the right-angle-turned, forward end 72 of a longitudinal slide bar 74 disposed in the slideway 66 between opposing pairs of vertically aligned, sunken guide rollers 76, which are likewise secured to the inner face of the upright wall 18.

Adjacent its rear extremity, the slide bar carries a transversely projecting pin 78 having its inner end engaged in a triangular opening 80 of a vertically slideable, latch dog 82, located in an upright channel 84 of the side wall 14. The vertical channel 84 is of greater depth than the intersecting horizontal slideway 66 so that the latch dog 82 is overlaid by the slidebar 74, and limited horizontal movement of the slide bar 74 and attached latch pin 78 along the angular edge of the opening 80 will raise the dog (as the bar is thrust back), or allow the dog to drop down by gravity (or spring tension, if desired) as the slidebar is drawn forward. The dog 82 is held in the channel 84 by a vertically spaced pair of retainer bolts 86 each having a flat head which is slidably retained in an elliptical recess 88 which surrounds a vertical slot 90 in the latch dog, through which slot the bolt extends and is anchored in side member 14. The lower end of the dog in its dropped position projects below the sliding drawer and is formed with a forward cam edge 92 so as to readily ride forwardly over successive angularly directed detents 94 of the fixed stop bar 13 of the outer shell 12, but will be held against being pushed rearwardly against their vertical face until the dog is lifted by retraction of the slide bar 74.

I claim:

1. An assembly of the character described comprising, in combination: a stationary frame having parallel, upright outer side walls; a slidable supporting device disposed between said side walls and having upright inner side walls spaced inwardly from and in opposed, adjacent relation to said outer side walls in an arrangement such as to define a slide chamber between each outer side wall and the adjacent inner side wall along each side of the frame; horizontal ribs each carried by one of said side walls and each formed with vertically projecting inner rails along its upper and lower margins; vertically opposed, parallel, horizontal outer rails each carried by a side wall opposed to a respective rib-carrying side wall and vertically spaced from the rib thereof; a horizontally slidable, generally upright slide disposed within each chamber, having respective arms extending horizontally along its upper and lower margins and projecting transversely into the space between respective vertically opposed rails, each of said arms having intermediate rails extending along its top and bottom margins respectively and vertically opposed to respective intermediate rails; and a pair of endless chains each mounted along a respective arm with its inner stretch in rolling registration with the opposed intermediate and inner rails, and with its outer stretch in rolling registration respectively with the opposed intermediate and outer rails.

2. An assembly of the character described comprising, in combination: a stationary frame having an upright outer side wall; a slidable supporting device having an inner side wall spaced inwardly from and opposed to said outer side wall and defining therewith a slide chamber; a horizontal rib carried by one of said side walls and formed with a vertically projecting inner rail extending longitudinally therealong; a horizontally extending outer rail carried by the other side wall and vertically opposed to and separated from said inner rail by a horizontally extending space; a horizontally slidable, generally upright slide disposed within said chamber, having a horizontally extending arm transversely projecting into said space and formed with intermediate rails extending along its upper and lower longitudinal margins respectively and vertically opposed to said outer and inner rails respectively; and an endless chain mounted along said arm with its inner stretch in rolling registration with inner and intermediate rails, and with its outer stretch in rolling registration respectively with intermediate and outer rails.

3. An assembly of the character described, comprising, in combination: a stationary frame having a pair of parallel upright outer side walls; a slidable supporting device disposed between said outer side walls and having a pair of upright inner side walls opposed to and horizontally space from respective outer side walls so as to define respective slide chambers therebetween along respective sides of the frame; a pair of horizontal ribs each carried by one of said pairs of side walls and formed with upper and lower vertically projecting inner rails extending along the upper and lower longitudinal margins thereof; vertically projecting upper and lower horizontal outer rails carried by each of the other pair of side walls in vertically opposed registration with and spaced vertically outwardly of said rib rails; a pair of horizontally slidable, generally upright slides of C-section disposed within respective chambers, each having vertically spaced, transversely projecting arms extending longitudinally along its top and bottom margins, projecting laterally into the spaces between respective opposed outer and inner rails, and each formed with upper and lower horizontal intermediate rails in vertically opposed relation to respective outer and inner rails; and endless chains mounted along respective arms, each of said chains having its inner stretch in rolling registration with respective opposed inner and intermediate rails and with its outer stretch in rolling registration with respective opposed intermediate and outer rails, each of said endless chains carrying rollers, each formed with a pair of radial flanges jointly defining a guide channel therebetween for embracing reception of a respective rail.

4. An assembly of a character described comprising, in combination, a stationary frame having parallel, upright outer side walls; a slidable supporting device disposed between said side walls and having respective inner side walls spaced inwardly from and in horizontally opposed relation to said outer side walls so as to define respective slide chambers therebetween along respective sides of the frame; horizontal ribs each carried by one of said side walls and each formed with inner rails extending horizontally along its upper and lower margins; aligned, vertically projecting longitudinally extending outer rails each carried by a side wall adjacent to a respective rib carrying side wall and in vertically opposed, spaced relation to a respective inner rail, defining therewith a horizontally extending space; a pair of horizontally slidable, generally upright slides disposed within the respective chambers, each of said slides having vertically spaced longitudinally extending arms each transversely projecting into a respective one of said spaces and formed with vertically projecting intermediate rails along its top and bottom margins; and a pair of endless chains mounted in embracing relation to each of said arms, each of said chains having its inner stretch in rolling registration with respective inner and intermediate rails and with its outer stretch in rolling registration with respective intermediate and outer rails; each of said slide arms carrying respective pairs of idler rollers disposed at respective ends thereof within and in rolling registration with the respective endless chains, one pair of idler rollers being adjustably tensioned against the chains to prevent slack therein; each of said endless chains being formed of successive transverse spacers joined together between pairs of links, each spacer carrying a roller journalled thereon and formed with a pair of radial flanges for embracing reception of a respective rail.

5. An assembly of the character described comprising, in combination: a stationary frame having parallel, upright outer side walls; a slidable supporting device disposed between the said side walls and having opposed, generally parallel upright inner side walls opposed to and spaced inwardly from respective outer side walls so as to define respective slide chambers therebetween along respective sides of the frame; each of said inner side walls having an integral horizontally extending rib projecting laterally into a respective chamber and formed with horizontal rails along its top and bottom edges respectively; a pair of vertically separated horizontal rails carried by each of the respective outer side walls along the upper and lower margins thereof and projecting respectively downwardly and upwardly therefrom in vertically spaced, opposed registration with respective inner rails; and a pair of horizontally slidable, generally upright slides disposed within respective chambers, each slide having a pair of transversely projecting arms interposed between respective opposed inner and outer rails and having respective intermediate rails along the upper and lower longitudinal margins thereof, in registration with respective opposed inner and outer rails; and endless roller chains mounted along respective slide arms, each with its inner stretch rollingly interposed between a respective opposed pair of inner and intermedite rails and with its outer stretch rollingly interposed between respective opposed intermediate and outer rails.

References Cited in the file of this patent

UNITED STATES PATENTS

| 2,267,043 | Premo | Dec. 23, 1941 |
| 2,664,970 | Warshaw | Jan. 5, 1954 |
| 2,723,886 | Warshaw | Nov. 15, 1955 |

FOREIGN PATENTS

| 730,922 | France | May 23, 1932 |